United States Patent
Fustolo (10) Patent No.: US 7,063,536 B1
(45) Date of Patent: Jun. 20, 2006

(54) SYSTEM FOR DELIVERING AN EDUCATIONAL PROGRAM TO A REMOTE SITE AND FOR MONITORING PARTICIPATION THEREIN

(76) Inventor: Steven C. Fustolo, 110 Church St., Winchester, MA (US) 01890

( * ) Notice: Subject to any disclaimer, the term of this patent is extended or adjusted under 35 U.S.C. 154(b) by 6 days.

(21) Appl. No.: 09/808,515

(22) Filed: Mar. 14, 2001

Related U.S. Application Data (60) Provisional application No. 60/189,305, filed on Mar. 14, 2000.

(51) Int. Cl.
*G09B 7/00* (2006.01)

(52) U.S. Cl. .................. 434/323; 434/322; 434/350; 434/118; 709/224

(58) Field of Classification Search ............. 434/322, 434/350, 118; 709/217–219, 225

See application file for complete search history.

(56) References Cited

U.S. PATENT DOCUMENTS

| | | | | |
|---|---|---|---|---|
| 6,024,572 | A * | 2/2000 | Weyer | 434/169 |
| 6,064,856 | A * | 5/2000 | Lee et al. | 434/350 |
| 6,120,298 | A * | 9/2000 | Jenkins et al. | 434/236 |
| 6,149,440 | A * | 11/2000 | Clark et al. | 434/322 |
| 6,149,441 | A * | 11/2000 | Pellegrino et al. | 434/350 |
| 6,282,404 | B1 * | 8/2001 | Linton | 434/350 |
| 6,489,979 | B1 * | 12/2002 | Belknap et al. | 345/854 |
| 6,678,824 | B1 * | 1/2004 | Cannon et al. | 713/200 |
| 2002/0116509 | A1 * | 8/2002 | DeLaHuerga | 709/229 |

* cited by examiner

*Primary Examiner*—Monica Carter
*Assistant Examiner*—Cameron Saadat
(74) *Attorney, Agent, or Firm*—Pandiscio & Pandiscio (57) ABSTRACT

A system for delivering an educational program to a participant at a remote site and for monitoring participation therein. The system includes a server computer, a client computer and prompting means to monitor participation by the participant. The server computer has educational program software and interacts with the client computer in order to make an educational presentation to the participant. If the participant does not adequately respond, the prompting means terminate the educational program.

31 Claims, 3 Drawing Sheets

SYSTEM FOR DELIVERING AN EDUCATIONAL PROGRAM TO A REMOTE SITE AND FOR MONITORING PARTICIPATION THEREIN

REFERENCE TO PENDING PRIOR PATENT APPLICATION

This patent application claims benefit of abandoned prior U.S. Provisional Patent Application Ser. No. 60/189,305, filed Mar. 14, 2000 by Steven C. Fustolo for WEB BROADCAST GROUP PROGRAM SEMINAR MODEL MONITORING PROGRAM, which patent application is hereby incorporated herein by reference.

FIELD OF THE INVENTION

This invention relates to educational programs in general, and more particularly to computer-based educational programs.

BACKGROUND OF THE INVENTION

Many educational programs need to be presented to participants who are located at remote sites. In such a situation, the participants must either physically travel to a central site, or the educational program must be delivered to the participants at their remote sites.

Where the educational program is to be delivered to the participants at their remote sites, the educational program is traditionally delivered either via live broadcast or via pre-recorded media such videotape, CD-ROM, DVD, etc.

While such live broadcast and pre-recorded media distribution is satisfactory for many purposes, it does not adequately address all situations.

One situation which is not adequately addressed by such live broadcast and pre-recorded media distribution, and of particular interest to the present invention, is that of professional continuing education programs.

More particularly, professional continuing education programs may be required for many different professions, e.g., accounting, legal, etc. In this situation, the entity responsible for administering the continuing education program (sometimes hereinafter referred to as the "continuing education administrator") is generally very concerned with verifying that the participant actively works through the educational program. This is particularly true inasmuch as program credit is traditionally awarded on the basis of program attendance rather than on the basis of passing specific examinations.

As a result, continuing education administrators have generally been reluctant to allow a participant to accrue program credit by individually watching a live broadcast, or by individually watching pre-recorded media such as videotape, CD-ROM, DVD, etc. Instead, the participant has traditionally been required to physically attend a monitored program session in order to receive program credit. Unfortunately, this may require the participant to physically travel to another location, and requires that the participant be available at the time that the monitored program session is being offered.

SUMMARY OF THE INVENTION

Accordingly, one object of the present invention is to provide a system for delivering an educational program to a remote site and for monitoring participation therein.

Another object of the present invention is to provide a system for monitoring participation in an educational program even where the participant is located at a remote site.

These and other objects are addressed by the present invention, which comprises a system for delivering an educational program to a remote site and for monitoring participation therein.

In accordance with a feature of the present invention, there is provided a system for delivering an educational program to a participant at a remote site, said system comprising: a server computer having educational program software; a client computer connected to said server computer over a network, said server computer interacting with said client computer to deliver an educational program to said participant; and prompting means for prompting said participant for a response during said educational program, said prompting means terminating said educational program when said response is inadequate from said participant.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like elements and further wherein.

DETAILED DESCRIPTION OF THE PREFERRED EMBODIMENTS

Figure 1:
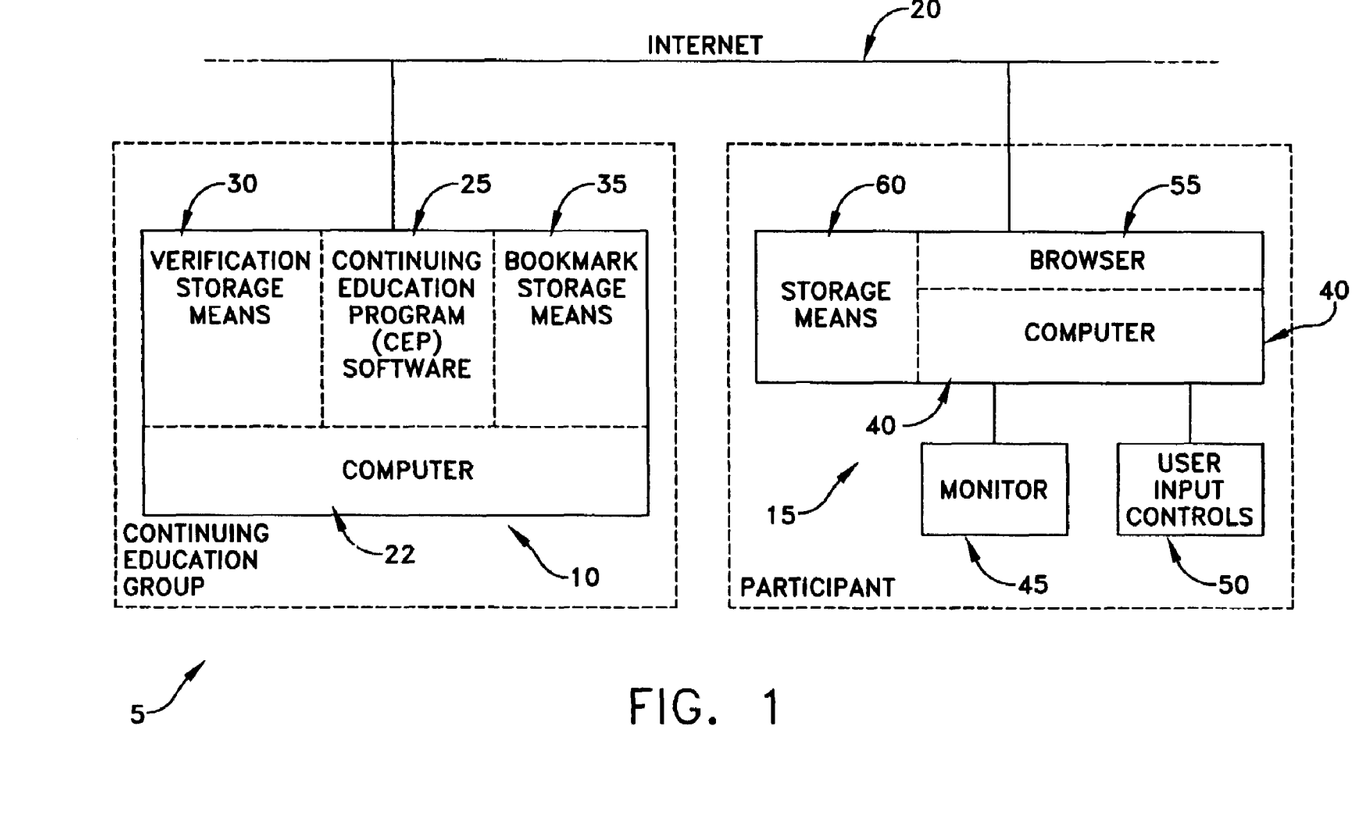
FIG. 1 is a schematic view of a system for delivering an educational program to a remote site and for monitoring participation therein.

Looking first at FIG. 1, there is shown a system 5 for delivering an educational program to a remote site and for monitoring participation therein. System 5 generally comprises a server 10 and a client 15, connected together through a network such as the Internet 20. If desired, system 5 may operate as an ASP environment.

More particularly, server 10 comprises a computer 22, continuing education program software (sometimes hereinafter referred to as "CEP software") 25, verification storage means 30 and bookmark storage means 35, as will hereinafter be discussed in further detail.

In a preferred embodiment, client 15 in turn comprises a computer 40 including a monitor 45 and user input controls 50, and standard Web browser software 55, as will hereinafter be discussed in further detail. In another preferred embodiment, client 15 comprises a Web TV computer system or another such "non-PC" computer system.

System 5 is configured and programmed so as to operate as follows.

Figure 2:
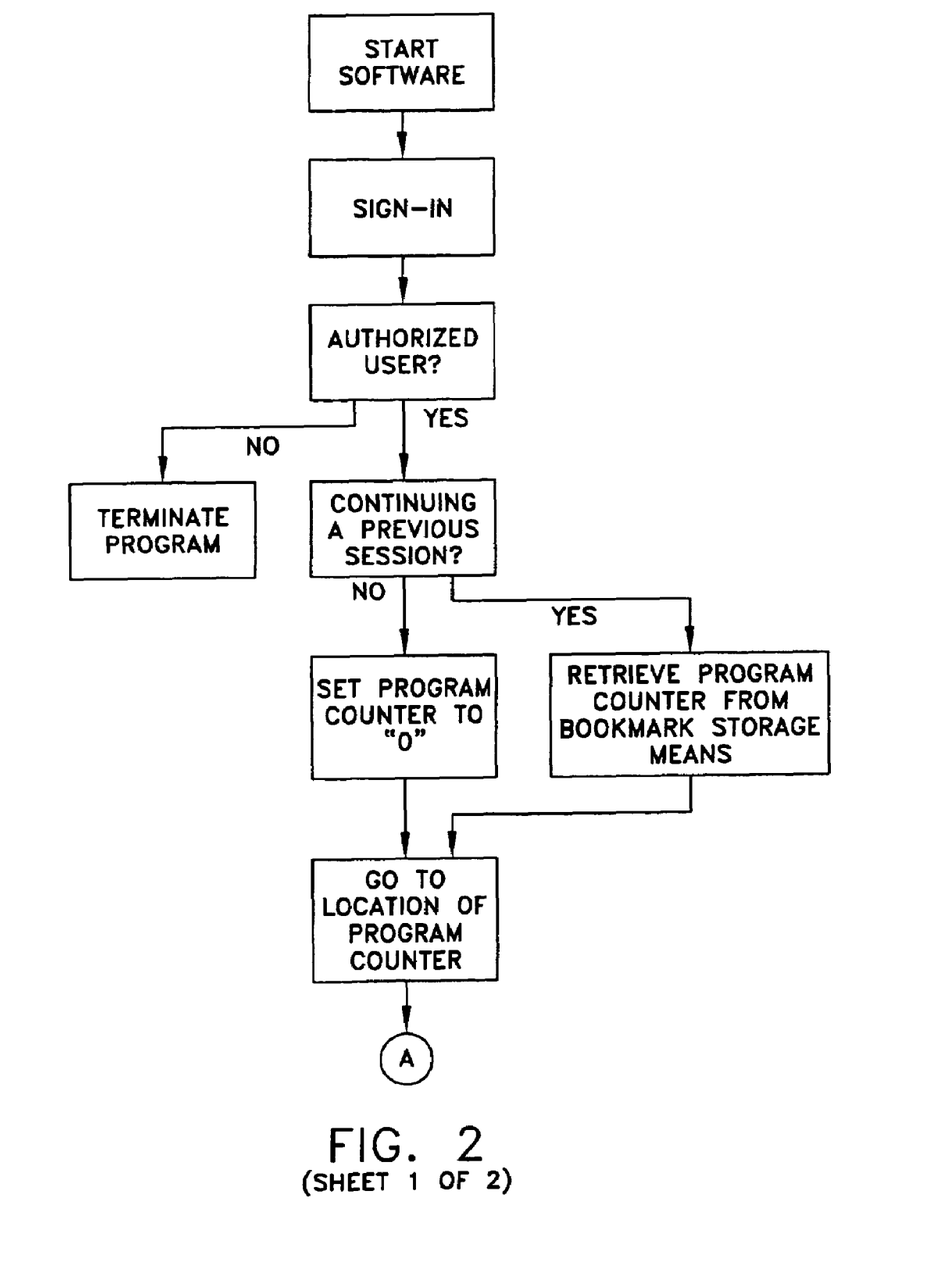
FIG. 2 is a flowchart illustrating one preferred method for delivering an educational program to a remote site and for monitoring participation therein.

At the start of an educational program session, the participant uses computer 15, running Web browser 55, to connect to CEP software 25 via the Internet 20. When this initial connection occurs, CEP software 25 prompts the participant to "sign in". This is done by providing the participant with a screen prompt, with or without an accompanying sound, and asking the participant to provide a piece of personal identification information. This personal identification information may consist of a professional license number, a state automobile license number, a social security number, initials, date of birth, etc.; in essence, the personal identification information may be any information that is personal to the participant. CEP software 25 then compares the personal identification information supplied by the participant in response to the screen prompt with personal identification information previously provided to the continuing education administrator by the participant, e.g., at the time that the participant signed up for the continuing education program. If the personal identification information supplied at the screen prompt matches the personal identification information previously supplied to the continuing education administrator, CEP software 25 notes this in verification storage means 30 and then proceeds to the substantive program session. If, on the other hand, the personal identification information supplied at the screen prompt does not match the personal identification information previously supplied to the continuing education administrator, or if the participant does not provide the personal identification information within a prescribed time period, e.g., 30 seconds, the program session is aborted.

After the participant successfully signs in, the substantive program session then begins, with CEP software 25 sending the program content to browser 55 for display to the participant on monitor 45.

Thereafter, at least once during the presentation of the educational program, and preferably at least several times during the presentation of the educational program, CEP software 25 interrupts the educational program and prompts the participant for a piece of personal identification information. This is done by again providing the participant with a screen prompt, with or without an accompanying sound. If the personal identification information supplied by the participant in response to the prompt matches the personal identification information previously stored with the continuing education administrator, CEP software 25 notes this in verification storage means 30 and then continues on with the educational program.

If the participant successfully responds to each prompt for personal identification information and reaches the end of the educational program, this fact is recorded in verification storage means 30 and the participant is given credit for the complete program session.

If, on the other hand, the personal identification information supplied by the participant in response to the prompt does not match the personal identification information previously stored with the continuing education administrator, or if the participant does not provide the personal identification information within a prescribed time period, e.g., 30 seconds, the program session is terminated.

If the program session is terminated in this fashion prior to the conclusion of the educational program, the point of termination is noted in verification storage means 30. If and when that participant thereafter "signs" in again, the participant is able to continue on with the educational program from the point at which the participant last successfully responded to a prompt for personal information.

In another preferred embodiment of the invention, an educational clock tracks the viewing duration of the participant. The educational clock only runs while the program is playing at viewing speed. If the participant "fast forwards," or otherwise moves to another portion of the program, the educational clock does not count this non-viewing change in the program. In addition, where the same material is viewed more than once, each viewing of the program material is counted, so as to encourage review by the participant.

In a preferred form of the present invention, several different pieces of personal identification information are used, and preferably they are requested from the participant in a substantially random sequence.

And in a preferred form of the present invention, the point in time at which the prompt is generated is selected at a substantially random interval. Such randomness may include both the interval (or intervals) between each prompt, and the number of prompts generated in a particular session.

In another preferred form of the present invention, the prompt is generated at prescribed times rather than, or in addition to, substantially random intervals.

It is also possible for the participant to voluntarily stop the educational program in mid-session. In this case, the participant can use the user input controls 50 to advise computer 40 that the participant wishes to take a break. Computer 40 will correspondingly advise CEP software 25. CEP software 25 will then place a "bookmark" in bookmark storage means 35, noting the point at which the educational program was terminated. The bookmark permits the participant to subsequently continue the educational program at the point of previous termination.

It is also possible to prompt the participant for a response without requiring the entry of a piece of personal identification information. Thus, for example, the system can prompt the participant to type in information, click on a mouse button, or click with a TV clicker, at different times during the presentation of the educational program.

In another preferred embodiment of the present invention, the educational program, or a portion thereof, is delivered to computer 40 on a storage means 60. For example, digital storage means 60 may include videotape, CD-ROM, DVD, etc. CEP software 25 remotely controls, over the Internet, delivery of the educational program from the storage means 60, and/or server 10. This configuration, which provides at least a portion of the educational program on storage means 60, can be advantageous in limiting bandwidth requirements across the Internet while permitting participation at a remote site to be successfully monitored.

Numerous further variations, alterations, modifications and other derivations of the present invention will occur and/or become obvious to those skilled in the art in view of the foregoing detailed description of the preferred embodiments of the present invention. Accordingly, it is to be understood that the foregoing specification and the appended drawings are intended to be illustrative only, and not as limiting of the invention.

What is claimed is:

1. A system for delivering an educational program to a participant at a remote site and for monitoring the participant's use of the educational program, the system comprising:
   a server comprising a computer and software for delivering the educational program to the participant at a remote site; and
   a client comprising a computer located at the remote site, the client being connected to the server over a network, and the client being configured to receive the educational program from the server and display it to said the participant;
   the system further comprising:
   prompting means for prompting the participant for a response during delivery of the educational program, wherein the response does not require knowledge of subject matter of the educational program, the system being configured to (i) terminate the educational program if no response or an inadequate response is received; and (ii) record an occurrence of an adequate response in a verification storage means if an adequate response is received and then proceed on with the educational program;

wherein program credit is awarded to the participant if the participant adequately responds to all of the prompts, such that the educational program is viewed in its entirety.

2. The system of claim 1 wherein said prompting of said participant has a randomness factor.

3. The system of claim 2 wherein said randomness factor includes time intervals between each said prompting of said participant.

4. The system of claim 2 wherein said randomness factor includes the number of prompts generated during the educational program.

5. The system of claim 1 wherein said prompting occurs at a prescribed time.

6. The system of claim 1 wherein said client is "a non-PC" computer system.

7. The system of claim 6 wherein said client is a Web TV computer system.

8. The system of claim 1 wherein said response to said prompting means is a mouse click.

9. The system of claim 1 wherein said response to said prompting means is a click of a TV remote.

10. The system of claim 1 wherein said response to said prompting means is a depression of a key on a keyboard.

11. The system of claim 1 wherein said response to said prompting means is personal identification information of said participant.

12. The system of claim 1 wherein said response is personal identification information of said participant selected from the group comprising a professional license number, a state automobile license number, a social security number, initials and date of birth.

13. The system of claim 1 wherein said response to said prompting means is required within a time limit.

14. The system of claim 13 wherein said time limit is 30 seconds.

15. The system of claim 1 wherein said prompting of said participant includes at least one prompt over a two hour period.

16. The system of claim 1 wherein said verification storage means stores personal identification information of said participant selected from the group comprising a professional license number, a state automobile license number, a social security number, initials and date of birth.

17. The system of claim 16 wherein said personal identification information stored on the verification storage means is compared with said response from said prompting means.

18. The system of claim 1 further comprising bookmark storage means for storing a bookmark, said bookmark storage means allowing said participant to stop said educational program, said educational program being time indexed, said bookmark storage means recording the position of said time indexed educational program, wherein said bookmark storage means permits said participant to subsequently continue said educational program at said time indexed position.

19. The system of claim 1 further comprising a clock means to track a duration of said educational program viewed by said participant.

20. The system of claim 19 wherein said duration includes said educational program played at a viewing speed.

21. The system of claim 19 wherein said clock means tracks a total duration of said educational program viewed by said participant, said total duration including a sum of each said duration of a multiply viewed segment of said educational program.

22. The system of claim 1 wherein said network is the Internet.

23. The system of claim 1 wherein said client includes standard Web browser software for interacting with said prompting means of said server.

24. The system of claim 1 wherein said client includes standard Web browser software for interacting with said educational program software.

25. The system of claim 1 wherein the educational program is stored on the server and delivered over the network.

26. The system of claim 1 wherein at least a portion of the educational program is stored on storage means at said client.

27. The system of claim 26 wherein the at least a portion of the educational program stored on the storage means at the client is controlled over the network by the software of the server.

28. The system of claim 27 wherein said storage means is a videotape.

29. The system of claim 27 wherein said storage means is a CD-ROM.

30. The system of claim 27 wherein said storage means is a DVD.

31. A method for delivering an educational program to a participant at a remote site and for monitoring the participant's use of the educational program, the method comprising:

providing a server comprising a computer and software and providing a client comprising a computer located at the remote site and being connected to the server over a network, wherein the server delivers the educational program to the participant at the remote site and the client receives the educational program from the server and displays it to the participant;

prompting the participant for a response during delivery of the educational program, wherein the response does not require knowledge of subject matter of the educational program, the software (i) terminating the educational program if no response or an inadequate response is received; and (ii) recording an occurrence of an adequate response in a verification storage means if an adequate response is received and then proceeding on with the educational program; and awarding program credit to the participant if the participant adequately responds to all of the prompts, such that the educational program is viewed in its entirety.

* * * * *

UNITED STATES PATENT AND TRADEMARK OFFICE
CERTIFICATE OF CORRECTION

Page 1 of 5

PATENT NO.        : 7,063,536 B1
APPLICATION NO.   : 09/808515
DATED             : June 20, 2006
INVENTOR(S)       : Steven C. Fustolo

It is certified that error appears in the above-identified patent and that said Letters Patent is hereby corrected as shown below:

The Title Page, showing an illustrative figure, should be deleted and substitute therefor the attached title page.

Figure 2A:
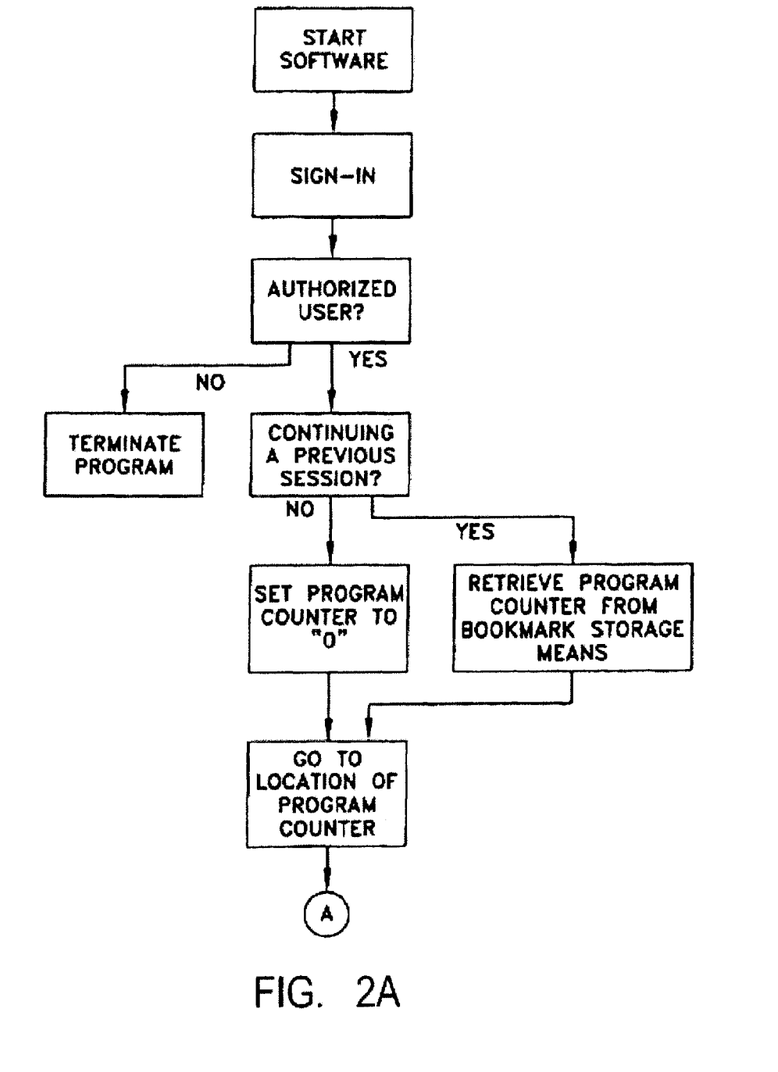
Figure 2B:
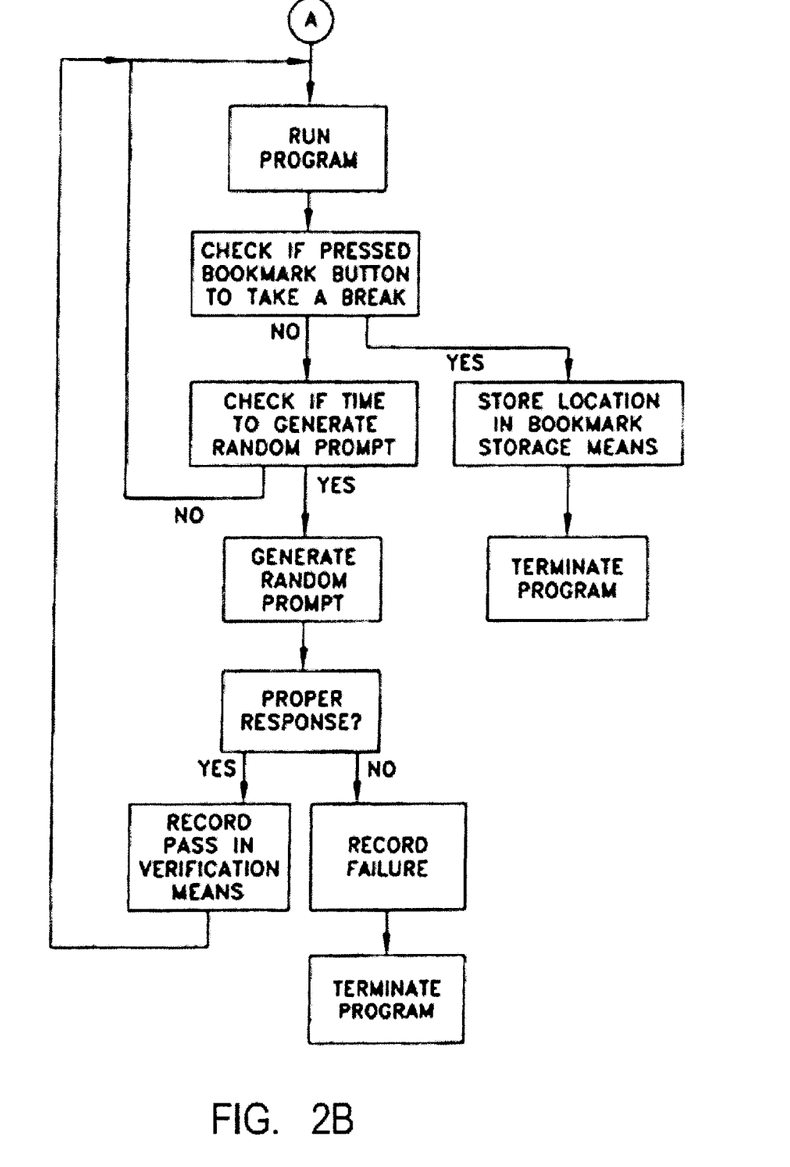

1. In the Drawings, delete the original three (3) sheets of drawings showing Figs. 1 and 2 and replace with the attached three (3) Replacement Sheets of drawings labeled "1/3", "2/3" and "3/3", showing Figs. 1, 2A and 2B, respectively; (see attached) and 2. Column 2, line 31, delete "FIG. 2 is" and replace with --FIGS. 2A and 2B are--.

Signed and Sealed this
Nineteenth Day of April, 2011

David J. Kappos
*Director of the United States Patent and Trademark Office*

(12) United States Patent
Fustolo (10) Patent No.: US 7,063,536 B1
(45) Date of Patent: Jun. 20, 2006

(54) SYSTEM FOR DELIVERING AN EDUCATIONAL PROGRAM TO A REMOTE SITE AND FOR MONITORING PARTICIPATION THEREIN

(76) Inventor: Steven C. Fustolo, 110 Church St., Winchester, MA (US) 01890

( * ) Notice: Subject to any disclaimer, the term of this patent is extended or adjusted under 35 U.S.C. 154(b) by 6 days.

(21) Appl. No.: 09/808,515

(22) Filed: Mar. 14, 2001

Related U.S. Application Data

(60) Provisional application No. 60/189,305, filed on Mar. 14, 2000.

(51) Int. Cl.
G09B 7/00 (2006.01)

(52) U.S. Cl. .............. 434/323; 434/322; 434/350; 434/118; 709/224

(58) Field of Classification Search .......... 434/322, 434/350, 118; 709/217–219, 225

See application file for complete search history.

(56) References Cited

U.S. PATENT DOCUMENTS

| | | | |
|---|---|---|---|
| 6,024,572 A * | 2/2000 | Weyer | 434/169 |
| 6,064,856 A * | 5/2000 | Lee et al. | 434/350 |
| 6,120,298 A * | 9/2000 | Jenkins et al. | 434/236 |
| 6,149,440 A * | 11/2000 | Clark et al. | 434/322 |
| 6,149,441 A * | 11/2000 | Pellegrino et al. | 434/350 |
| 6,282,404 B1 * | 8/2001 | Linton | 434/350 |
| 6,489,979 B1 * | 12/2002 | Belknap et al. | 345/854 |
| 6,678,824 B1 * | 1/2004 | Cannon et al. | 713/200 |
| 2002/0116509 A1 * | 8/2002 | DeLaHuerga | 709/229 |

* cited by examiner

*Primary Examiner*—Monica Carter
*Assistant Examiner*—Cameron Saadat
(74) *Attorney, Agent, or Firm*—Pandiscio & Pandiscio (57) ABSTRACT

A system for delivering an educational program to a participant at a remote site and for monitoring participation therein. The system includes a server computer, a client computer and prompting means to monitor participation by the participant. The server computer has educational program software and interacts with the client computer in order to make an educational presentation to the participant. If the participant does not adequately respond, the prompting means terminate the educational program.

31 Claims, 3 Drawing Sheets